S. A. RICHARDS, E. H. VAN EMBURGH & C. ZELLER.
LICENSE TAG HOLDER AND SPEED INDICATOR.
APPLICATION FILED JULY 30, 1914.

1,145,614.

Patented July 6, 1915.
2 SHEETS—SHEET 1.

Witnesses
M. A. Bond
Saml. Scrivener.

Inventors
Sweeten A. Richards, Eben H. Van Emburgh
and Clayton Zeller,
E. H. Bond
Attorney S. A. RICHARDS, E. H. VAN EMBURGH & C. ZELLER.
LICENSE TAG HOLDER AND SPEED INDICATOR.
APPLICATION FILED JULY 30, 1914.
1,145,614.
Patented July 6, 1915.
2 SHEETS—SHEET 2.
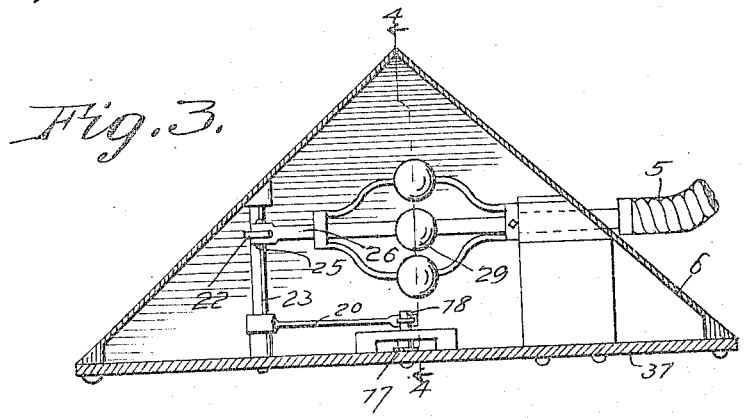
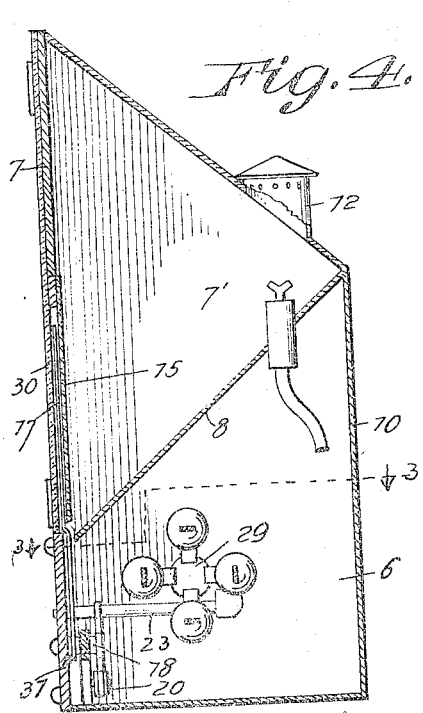
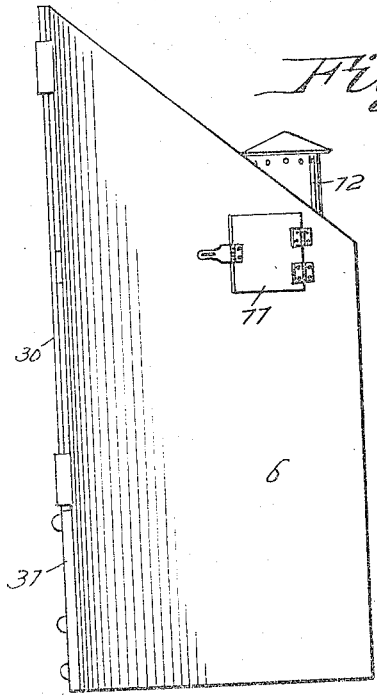

UNITED STATES PATENT OFFICE.

SWEDEN A. RICHARDS, EBEN H. VAN EMBURGH, AND CLAYTON ZELLER, OF EASTON, PENNSYLVANIA.

LICENSE-TAG HOLDER AND SPEED-INDICATOR.

1,145,614.  Specification of Letters Patent.  Patented July 6, 1915.

Application filed July 30, 1914. Serial No. 854,198.

*To all whom it may concern:*

Be it known that we, SWEDEN A. RICHARDS, EBEN H. VAN EMBURGH, and CLAYTON ZELLER, citizens of the United States, and residing at Easton, in the county of Northampton, State of Pennsylvania, have invented certain new and useful Improvements in License-Tag Holders and Speed-Indicators, of which the following is a specification.

This invention relates to certain new and useful improvements in license tags for automobiles and the like and it has for its objects among others to provide a simple and efficient device of this general character in which is combined a license tag and speed indicator with means for illuminating the same, whereby it is possible to tell either during the day or at night not only the license number of the car, but also whether or not it is exceeding the speed limits of the locality through which it is passing.

Suitable means are provided for actuating the indicator, such as a governor whereby the speed of the machine serves to automatically control the movements of the indicator.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1:
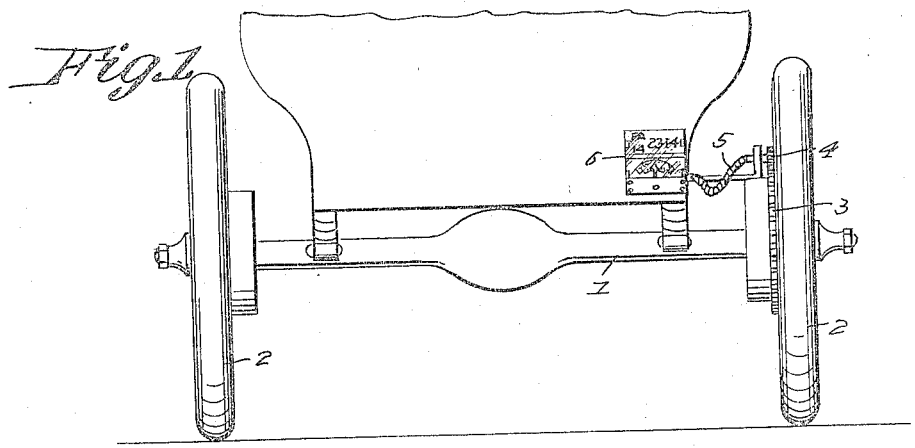
Figure 2:
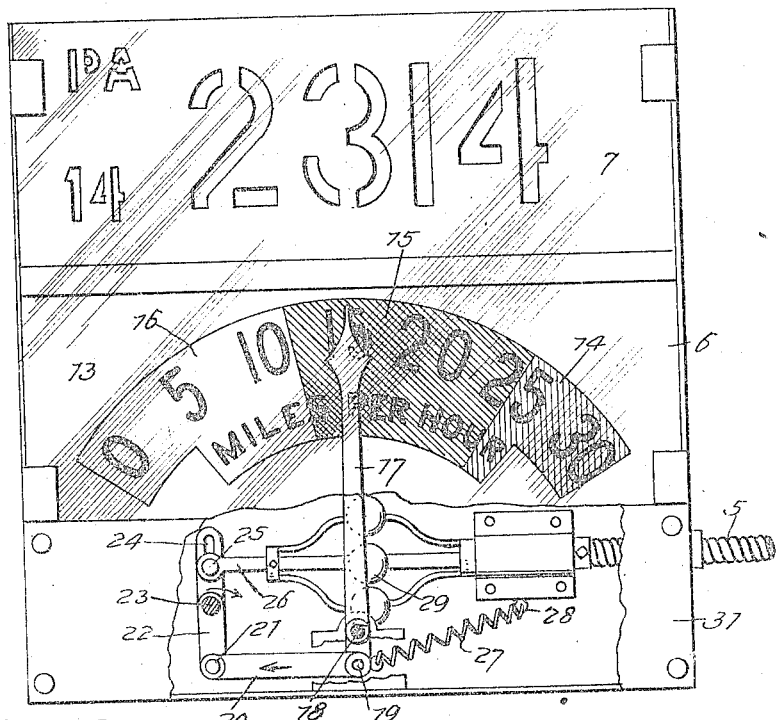

Figure 1 is a view looking at the rear end of an automobile showing our improvement applied. Fig. 2 is an enlarged front elevation with portions broken away. Fig. 3 is a transverse section, as on the line 3—3 of Fig. 4, looking in the direction of the arrows. Fig. 4 is a vertical section, as on the line 4—4 of Fig. 3, looking in the direction of the arrows. Fig. 5 is a side elevation.

Like numerals of reference indicate like parts throughout the several views.

It will be evident that the device hereinafter described may be attached to the rear or the front of the automobile and may be supported in position in any suitable manner, the novelty in the present instance not residing in the specific means of attachment or in the location of the device.

The invention is capable of embodiment in a variety of forms, that herein shown being what we consider at the present time the preferable one.

Referring to the drawings, 1 designates the axle and 2 the wheels of a motor vehicle of any well known or desired form of construction. On the wheel so as to rotate therewith, is a gear 3 with which meshes a smaller gear 4, 5 being a flexible shaft of known form, the construction and arrangement of parts being such that the speed of the machine will be communicated to the governor soon to be described, which will automatically control the movement of the indicator.

6 designates a casing which may be of any desired contour, such as triangular, as indicated in Fig. 3. It is designed to be attached to the automobile in any well known way. It has provision for holding the license tag 7, which tag and its mode of attachment may be as found most expedient. Within the upper part of the casing is formed a receptacle or compartment 7' by means of the inclined partition 8, as seen in Fig. 4, and within this compartment at the rear of the front wall thereof is arranged a gas or other burner 9 for the purpose of illuminating the license tag at night. This may be supplied from any suitable source by means of the tube or connection 10.

11 is a door in the side of the casing to permit access to the burner and 12 is a ventilator for an obvious purpose. At the front of the casing, and in this instance shown as below the license tag, there is a dial for showing the speed of the machine. In the present instance, it consists of a plate 13 secured in position in any suitable or well known way and provided with a red zone 14, a green zone 15 and a white zone 16, the latter indicating, in the present instance, the twelve mile limit, the green zone the twenty-four mile limit, and the red zone any excess of twenty-four miles. It is evident, however, that these indications as well as the variety of colored zones may be varied according to the State in which the machine is being run, as in some States the laws vary, but for the purpose of demonstration of the operation of the present device we will assume that the dial is arranged for the State of Pennsylvania under which State law the maximum speed is twenty-four miles per hour and the minimum speed is twelve miles per hour.

17 is an index hand or pointer pivotally mounted, as at 18, to some suitable support within the casing and pivotally connected with the lower end of this pointer, as at 19, is a horizontally extending arm 20, to which, in turn, is pivotally connected, as at 21, the lower end of an arm 22 which is pivotally mounted between its ends, as at 23, and is shown as provided at its upper end with an elongated slot 24 with which may be adjustably connected, as at 25, one end of the governor rod 26, the adjustment being provided in order that the point of connection of the member 26 with the arm 22 can be varied in order to permit the rod 26, which moves on a fixed horizontal line, free action and to prevent binding at the point 25.

27 is a spring connected at one end with the lower end of the pointer 17 adjacent the pivotal connection 19 of the arm 20 therewith and at its other end 28 connected to some fixed support within the casing, as shown clearly in Fig. 2.

29 is a ball governor of any well known or approved form of construction and operating in the following manner: As the speed of the machine increases, the balls are thrown outward and the arm 22 is moved in the direction of the arrow, Fig. 2, which brings or moves the arm 20 in the direction of the arrow shown thereon in said Fig. 2, thus moving the indicator or pointer 17 to the right, thereby indicating increased speed. The spring 27 serves to normally keep the pointer at zero, it being understood that zero designates the starting point and that as the machine travels its speed lifts the pointer one notch for every mile of increased speed.

The operation will be apparent. When the machine is passing through any municipality, the red zone of the indicator will show the authorities whether or not the speed exceeds the twenty-four mile limit. If the pointer is over the green zone, it indicates that the machine is going more than twelve miles an hour and not more than twenty-four. When the speed slows down to less than twelve miles, the pointer will be over the white zone, thus indicating that the twelve mile limit is not being exceeded. A transparent plate 30, see Fig. 4, is preferably placed over the license tag 7 and the limit indicating members 14, 15 and 16, and, as seen in Fig. 4, the pointer 17 works in the space between this transparent plate and the said members 14, 15 and 16. The lower portion of the casing is preferably provided with a removable plate 31 to permit access to the governor and other parts contained within the lower portion of the casing, for repairs or other purposes.

It will be understood that the object of using the colored zones is secondary to the figured mile indications and, besides showing certain legal limits, act as an aid to the eye which will naturally travel from the colored zone to the figured mile indication.

Modifications in details may be resorted to without departing from the spirit of the invention or sacrificing any of its advantages.

What is claimed as new is:—

1. In a device of the class described, a dial with different colored zones, a pivotally mounted pointer for coöperation therewith, an arm connected with one end of said pointer, a pivoted member connected with said arm, and a vehicle-controlled governor slidably connected with said member.

2. In a device of the class described, a dial with different colored zones, a pivotally mounted pointer for coöperation therewith, an arm connected with one end of said pointer, a pivoted member connected with said arm, a vehicle-controlled governor connected with said member, and a spring connected with said pointer and acting in opposition to said governor.

3. In a device of the class described, a dial with different colored zones, a pivotally mounted pointer for coöperation therewith, an arm connected with one end of said pointer, a pivoted member connected with said arm, a vehicle-controlled governor slidably connected with said member, and a spring connected with said pointer and acting in opposition to said governor.

SWEDEN A. RICHARDS.
EBEN H. VAN EMBURGH.
CLAYTON ZELLER.

Witnesses:
RAYMOND S. KOCH,
JAMES McCANN.